Nov. 11, 1930.  R. E. JENKINSON  1,781,657
PNEUMATIC TIRE
Filed March 16, 1926
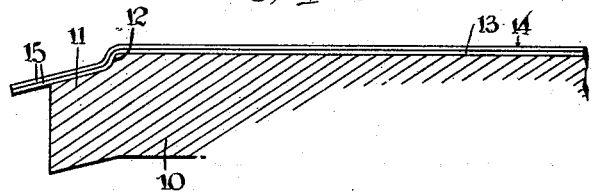
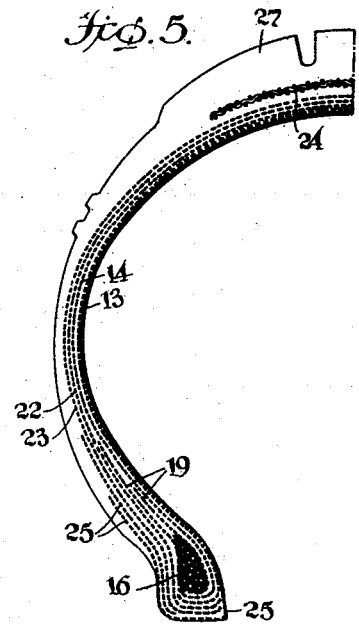
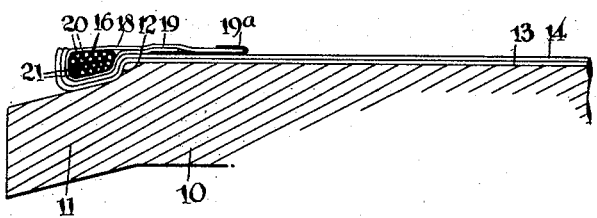
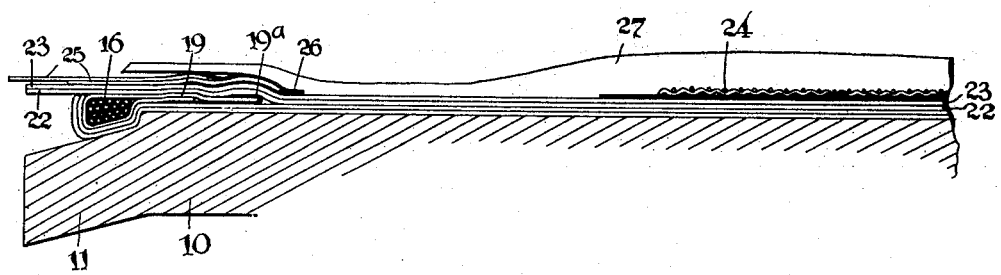
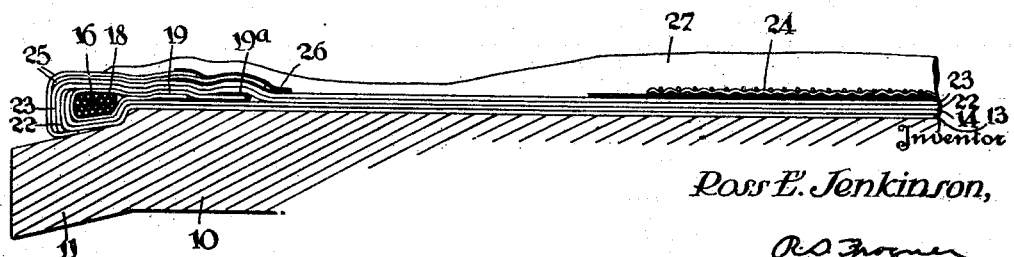

Patented Nov. 11, 1930

1,781,657

UNITED STATES PATENT OFFICE

ROSS E. JENKINSON, OF AKRON, OHIO, ASSIGNOR TO THE GOODYEAR TIRE & RUBBER COMPANY, OF AKRON, OHIO, A CORPORATION OF OHIO

PNEUMATIC TIRE

Application filed March 16, 1926. Serial No. 95,060.

My invention relates to pneumatic tires and a method of building the same, and it has particular relation to the so-called "flat-built" tires, which are fabricated upon drums having edges that are beveled outwardly and are of diminishing peripheral diameter.

One object of my invention is to lessen the cost of preparing the rubberized stocks which are utilized in fabricating pneumatic tires.

Another object of the invention is to reduce the number of the different widths of the fabric elements which are employed in fabricating automobile tires.

A further object of my invention is to simplify the building operations, thereby increasing the output of a tire building unit and at the same time obviating inaccuracies of workmanship, and another object of my invention is to provide a novel method of tying in the bead portion and securing its anchorage.

In its essentials, a pneumatic tire consists of a plurality of strips of rubberized fabric, which are superimposed in aligned relation, a set of beads and a tread portion. These elements are vulcanized together to form an integral tire product, such as is found in commerce.

One of two methods is universally employed to assemble the elements prior to their vulcanization. The first is the so-called "core-built" method, in which the plies of fabric are superimposed about an annular mandrel that is of substantially the same shape as the finished tire product; whereas the other method, commonly referred to as the "flat-built" or "drum-built" method, differs from the former in that the elements are superimposed about a flat mandrel or drum. The resulting assembly is a flat band, which must be properly shaped before vulcanization. The shaping step involves distending the central portion of the band, and at the same time permitting the bead or outer portions to approach each other. Such operation is performed by means of any one of several devices that are well known in the tire art.

Each method possesses certain advantages over the other. Generally speaking, the so-called "flat-built" method is being substituted for the "core-built" method for small size tires. This transition is due in part to the lower cost of fabrication. Several modifications of this basic method are commonly employed; two of these have enjoyed outstanding popularity. According to one method, the elements constituting a tire are superimposed upon a drum having a substantially flat surface. The method involves a difficult bead setting operation and necessitates a large inventory of stocks, which, together with other shortcomings, renders it objectionable. Several of the difficulties are overcome by the other method, which utilizes a drum, the edges of which are beveled inwardly to accommodate the bead. Obviously, many of the operations must be performed out of the plain view of the builder, and in addition certain mechanical difficulties are met while performing the stitching and tying in operations. For example, the stitching operations, which must be performed within the drum are hindered by its structural elements.

In contra-distinction to these methods and the drums employed therewith, and according to the principles of my invention the tire elements are assembled upon a drum having outwardly beveled edges. The method provides for a durable bead "tie in", which necessitates but a minimum amount of ply fabric. Furthermore, the plies of rubberized textile material may be cut to the same width. This entails a saving, not only in the cost of preparing the stock preliminary to its assemblage, but also by reason of the small number of different widths of fabric which must be maintained. From the description of the steps involved, as hereinafter set forth, it will be apparent that a greater output of product is made possible without excessive investment, and because of their simplicity no great amount of skill is required, nor is a long period of apprenticeship necessary for the training of a tire builder.

The method may be practised with any type of tire building machine embodying a drum having the aforementioned characteristics. For this reason, no description of a machine is necessary to a full understanding of the principles of my invention. The drawings include sketches, which illustrate the relation of elements as they are assembled upon a drum and stitched into their final position. Referring thereto, Fig. 1 is a sectional view of half of a drum, having two plies of fabric superimposed thereon, whose edges are stitched to conform to the beveled portion of the drum;

Fig. 2 is a similar view illustrating an assembly of elements of a tire carcass after the beads have been positioned and tied in by the marginal portion of the lower plies of fabric;

Fig. 3 depicts the relation of the elements which constitute the tire after they have been assembled about the drum and are in readiness for the final stitching operation;

Fig. 4 is a sectional view of the elements illustrated in Fig. 3, after the final stitching and "tying in" operations have been completed; and Fig. 5 is a sectional view of a portion of a vulcanized tire which illustrates the relation of the elements in their final position.

Any suitable drum may be employed in practising my invention. However, I prefer one which in its essentials embodies a plane cylindrical portion 10, having outwardly beveled edges 11. It may entail a slight modification advantageously by having a notch or groove 12 in the beveled portion, which is adapted to facilitate the bead setting operation, as will be described more completely hereinafter. The drum should be of a collapsible construction, in order that the assembled product may readily be removed.

While the width of the drum from bead to bead is practically constant for tires of one size, the width of the bevel portion may vary widely. For example, in Fig. 1 the edge portions of the plies of fabric are shown to extend beyond the bevel, whereas those in Fig. 3 are substantially in alignment therewith. The former construction offers less obstruction to the operation of a mechanical stitcher and tying-in device. The extended bevel, on the other hand, is desirable when the operations are performed by means of hand tools.

For purposes of exemplification only, and not because the invention is so limited, the procedure involved in fabricating a four ply tire having non-extensible beads will be described in detail. In order to insure good adhesion between the drum and the plies of rubberized material that are to be superimposed thereon, particularly in the proximity of the bead portion, it is advisable to apply a thin coating of rubber cement about the beveled area. Subsequently, a strip of fabric 13, which has been cut on the bias and whose length is slightly greater than the circumference of the drum, is aligned thereabout, and the overlapping ends are then stitched together. A second ply 14 may then be placed about the drum in substantially the same manner. If the fabric employed is of cord construction, it may be found advisable to align the second ply in such manner that the cords will cross those of the first ply at right angles. The rubberized material is sufficiently tacky, or may be rendered so by treating its surface with a solvent, to retain its aligned position without applying pressure thereto by means of the stitching tool. Its edge protions 15, however, which overlap the bevel of the drum 11 must be stitched down to conform therewith. This may be effected by a hand or mechanically operated stitching device. It is desirable that the edge portion of the fabric adapt itself exactly to the beveled portion of the drum, particularly when the beveled portion includes a notch that is provided therein for the bead. If so desired, the strips 13 and 14 may be positioned jointly by aligning them before applying the resulting double unit to the surface of the mandrel.

The next step involves positioning a preformed bead 16 having a smaller diameter than the diameter of the cylindrical portion of the band at each side of the drum, which may be effected manually by the builder or mechanically by a bead setting mechanism adapted for the purpose. It will be noted that the bead illustrated includes a flipper strip 18, the skirt 19 and rubber tip 19$^a$ of which overlap the edge of the plain surface of the drum. The inextensible portion, however, is set against the notch 12, where it is retained by the cohesive action of the adjoining rubberized fabrics. It should be observed that the bead illustrated embodies a metallic braid 21, preferably composed of a plurality of braided strands. Also the braid is preferably of rectangular cross-section, although a plurality of wire strands, which form beads of circular cross-section, may likewise be employed.

Heretofore, it was believed essential to a satisfactory "tie in" that one or more of the plies of fabric completely enclose the bead. Such construction is obviated by the present invention, hence a considerable saving of expensive ply fabric is obtained. The marginal portion of the ply 15 is turned about the bead, but is insufficient to enclose or "tie in" the same completely, though it does enclose substantially two-thirds of its circumference. The "tying in" operation may be easily performed while the drum is rotated, by inserting a blunt tool between the bevel of the drum and the fabric, which has previously been caused to conform thereto. As the rotation is continued, the edge of the fabric is stitched to the bead by raising the blunt tool.

The skirt portion of the bead is then caused to adhere to the lower ply before additional plies of fabric 22 and 23 are superimposed about the drum. A breaker strip 24 is then applied, after which a set of chafing strips 25 which embody a rubberized edge portion 26 are superimposed in the position indicated in Fig. 3. Subsequently a tread 27 is applied in alignment to complete the assembling operation.

Although the manner of applying the several elements to the drum is optional with the operator, very satisfactory results have been obtained by providing a guide mechanism which may be swung into operative relation with respect to the drum. By this means the tire elements are aligned with the drum which is being slowly rotated before engaging the same.

Thus far, but two stitching operations have been performed, both of which are of minor character. The first involves stitching down the edge portions of the plies 13 and 14 to conform to the bevel of the drum, whereas the second stitches the skirt portion and partially encloses the bead with the marginal portion of the initial plies. The major stitching operation is now in order. This may well be performed by mechanical means, inasmuch as considerable pressure is allowable. While any suitable roll which may be played along the rotating surface of the drum will suffice, the operation may be well performed by the device disclosed in the copending application, Serial No. 123,651, filed July 20, 1926, assigned to The Goodyear Tire & Rubber Company. Such device is adapted not only to stitch down the elements in their final position, but also to turn down the extended portion of the plies and chafing strip, thereby completing the "tying in" operation. Many other stitching tools, which are well known in the art, can be employed in the same capacity. This operation completes the fabrication, whereupon the drum is collapsed and the assembly removed. Subsequently, it is shaped and vulcanized. In the finished tire the various elements assume the relation illustrated in Fig. 5.

Certain variations in the method set forth will readily be apparent, for example, additional stitching operations at various intervals may be performed, yet these require considerable time and have been found non-essential. It will also be apparent that the margin of the fabric, which is utilized in tying in the bead may be lengthened. I have found, however, that an excess above that described is unnecessary, and inasmuch as the fabric, as well as the rubber medium is expensive, the omission results in a desirable saving. Moreover, the fact that the plies are of equal width overcomes the necessity of maintaining a large assortment of different widths of bias cut fabric.

A rotary bias cutter may be employed to advantage in conjunction with the present method, inasmuch as its major shortcoming, namely, its lack of adjustability, is no longer objectionable. It is well known, of course, that the accuracy and output of a rotary bias cutter far exceeds that of any other type. This will, in itself, result in an additional saving, since the tolerance is reduced to a minimum and the trimming of excess selvage due to inaccurate ply widths is practically eliminated.

Not only does my method reduce the cost of stock preparation, but inasmuch as a smaller assortment of stocks is required and, therefore, a greater turnover of the elements brought about, the stock will be fresh, and less difficulty will be experienced due to a dry, non-adhesive stock. From a practical standpoint, another feature of the present invention will be appreciated, namely, an advantage in training workmen. Usually, several months of apprenticeship are required before the average workman will have mastered the several building operations. While this disadvantage is more marked in the "core-built" method than in the "flat-built" method, the simplifications which are introduced by the present invention reduce the time required far below that which has been found necessary heretofore. A corollary to the proposition above follows, namely, inasmuch as the operations are simplified, the inaccuracies in workmanship will be fewer, and quality of the product will be uniformly improved.

Although I have described the principles of my invention as applied to a single embodiment, namely, a four ply tire having rectangular non-extensible beads, it will be apparent from the description that they are not so limited, but may be extended to other types of tires and beads, and that many modifications of the several steps involved may likewise be instituted without departing from the spirit and scope of the invention.

What I claim is:

1. A method of fabricating flat built tire casings which comprises providing inner bands of fabric of equal width, shaping the bands to have substantially cylindrical midportions and outwardly inclining the marginal portions, applying molded semi-cured beads of substantially polygonal configuration to the margins, turning the edges of the fabric upwardly about the beads to enclose the latter upon two sides, providing additional plies of fabric of the same width as the first mentioned plies and disposing them in position upon the partially formed carcass, adding a tread element and such other elements as are required to complete the assembly, then stitching the margins of the last mentioned fabric plies downwardly over the beads to complete the enclosure thereof, finally shaping the fabricated tires and subjecting them to vulcanization.

2. A method of fabricating flat built tires which comprises providing inner bands of fabric of identical width and shaping them to provide substantially cylindrical midportions, disposing beads having polygonal sectional configuration upon the bands in such manner as to have projecting margins, turning the margins upwardly about the beads to enclose the latter upon two sides, providing additional plies of fabric of the same width as the first mentioned plies, and a tread element, upon the partially formed carcass, stitching the various elements together and turning the last mentioned plies of fabric downwardly about the beads to complete the enclosure thereof, shaping the assembly and subjecting it to vulcanization in the usual manner.

In witness whereof, I have hereunto signed my name.

ROSS E. JENKINSON.